US006214907B1

(12) United States Patent
Tomka

(10) Patent No.: US 6,214,907 B1
(45) Date of Patent: *Apr. 10, 2001

(54) BIOLOGICALLY DEGRADABLE POLYMER MIXTURE

(75) Inventor: Ivan Tomka, Bourguillon (CH)

(73) Assignee: Bio-Tec Biologische Naturverpackungen GmbH & Co. KG (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/153,946

(22) Filed: Sep. 16, 1998

Related U.S. Application Data

(63) Continuation of application No. 08/819,152, filed on Mar. 17, 1997, now Pat. No. 5,844,023, which is a continuation of application No. 08/437,515, filed on May 9, 1995, now abandoned, which is a continuation of application No. 08/147,788, filed on Nov. 4, 1993, now abandoned.

(30) Foreign Application Priority Data

Nov. 6, 1992 (DE) .................................. 42 37 535

(51) Int. Cl.[7] .................................................... C08L 3/00
(52) U.S. Cl. ............................... 524/47; 524/18; 524/37; 524/39; 524/40; 524/41; 524/42; 524/46; 524/50; 524/52; 525/54.1; 525/54.21; 525/54.24; 525/54.26; 428/481; 428/532
(58) Field of Search .......................... 524/18, 37, 39, 524/40, 46, 47, 50, 52, 41, 42; 525/54.1, 54.21, 54.24, 54.26; 428/481, 532

(56) References Cited

U.S. PATENT DOCUMENTS

| | | | |
|---|---|---|---|
| 3,850,863 | 11/1974 | Clenninning et al. ............. 260/7.5 |
| 3,867,324 | 2/1975 | Clendinning et al. ............. 260/23 H |
| 3,921,333 | 11/1975 | Clendinning et al. ............. 47/37 |
| 3,949,145 | 4/1976 | Otey et al. ............. 428/423 |
| 4,076,846 | 2/1978 | Nakatsuka et al. ............. 426/62 |
| 4,133,784 | 1/1979 | Otey et al. ............. 260/17.4 ST |
| 4,306,059 | 12/1981 | Yokobayashi et al. ............. 536/1 |
| 4,394,930 | 7/1983 | Korpman ............. 220/444 |
| 4,410,571 | 10/1983 | Korpman ............. 427/385.5 |
| 4,454,268 | 6/1984 | Otey et al. ............. 524/47 |
| 4,482,386 | 11/1984 | Wittwer et al. ............. 106/135 |
| 4,655,840 | 4/1987 | Wittwer et al. ............. 106/126 |
| 4,673,438 | 6/1987 | Wittwer et al. ............. 106/126 |
| 4,846,932 | 7/1989 | Karita et al. ............. 162/127 |
| 4,863,655 | 9/1989 | Lacourse et al. ............. 264/53 |
| 5,035,930 | 7/1991 | Lacourse et al. ............. 428/35.6 |
| 5,043,196 | 8/1991 | Lacourse et al. ............. 428/35.6 |
| 5,059,642 | 10/1991 | Jane et al. ............. 524/52 |
| 5,095,054 | 3/1992 | Lay et al. ............. 524/47 |
| 5,108,807 | 4/1992 | Tucker ............. 428/35.2 |
| 5,110,838 | 5/1992 | Tokiwa et al. ............. 521/81 |
| 5,115,000 | 5/1992 | Jane et al. ............. 524/47 |
| 5,185,382 | 2/1993 | Neumann et al. ............. 521/84.1 |
| 5,186,990 | 2/1993 | Starcevich ............. 428/35.6 |
| 5,206,087 | 4/1993 | Tokiwa et al. ............. 428/403 |
| 5,208,267 | 5/1993 | Neumann et al. ............. 521/79 |
| 5,234,977 | 8/1993 | Bastioli et al. ............. 524/47 |
| 5,248,702 | 9/1993 | Neumann et al. ............. 521/84.1 |
| 5,252,271 | 10/1993 | Jeffs ............. 264/54 |
| 5,256,711 | 10/1993 | Tokiwa et al. ............. 524/47 |
| 5,258,430 | 11/1993 | Bastioli et al. ............. 524/52 |
| 5,262,458 | 11/1993 | Bastioli et al. ............. 524/52 |
| 5,266,368 | 11/1993 | Miller ............. 428/35.6 |
| 5,272,181 | 12/1993 | Boehmer et al. ............. 521/84.1 |
| 5,275,774 | 1/1994 | Bahr et al. ............. 264/211 |
| 5,280,055 | 1/1994 | Tomka ............. 524/47 |
| 5,286,770 | 2/1994 | Bastioli et al. ............. 524/52 |
| 5,288,318 | 2/1994 | Mayer et al. ............. 106/213 |
| 5,288,765 | 2/1994 | Bastioli et al. ............. 521/84.1 |
| 5,292,782 | 3/1994 | Bastioli et al. ............. 524/47 |
| 5,308,879 | 5/1994 | Akamatu et al. ............. 521/84.1 |
| 5,314,754 | 5/1994 | Knight ............. 428/532 |
| 5,314,934 | 5/1994 | Tomka ............. 524/53 |
| 5,317,037 | 5/1994 | Golden et al. ............. 523/128 |
| 5,360,830 | 11/1994 | Bastioli et al. ............. 521/84.1 |
| 5,362,777 | 11/1994 | Tomka ............. 524/47 |

(List continued on next page.)

FOREIGN PATENT DOCUMENTS

| | | |
|---|---|---|
| 0 032 802 A1 | 7/1981 | (EP) . |
| 0 327 505 A2 | 8/1989 | (EP) . |
| 0 400 532 A1 | 12/1990 | (EP) . |
| 0 407 350 A2 | 1/1991 | (EP) . |
| 0 408 502 A2 | 1/1991 | (EP) . |
| 0 408 503 A2 | 1/1991 | (EP) . |
| 0 409 781 A2 | 1/1991 | (EP) . |
| 0 409 782 A3 | 1/1991 | (EP) . |
| 0 524 920 A1 | 1/1993 | (EP) . |
| WO 93/00399 | 1/1993 | (EP) . |
| 0 525 245 A1 | 2/1993 | (EP) . |
| 0 535 994 A1 | 4/1993 | (EP) . |
| 0 539 541 B1 | 5/1993 | (EP) . |
| WO 90/05161 | 5/1990 | (WO) . |

OTHER PUBLICATIONS

Mater Bi, *Stärkewerkstoffe Sind Reif Für Breite Anwendungen*.

Primary Examiner—Judy M. Reddick
(74) Attorney, Agent, or Firm—Workman, Nydegger & Seeley

(57) ABSTRACT

A biologically degradable polymer mixture is proposed which consists essentially of starch and at least one hydrophobic polymer. The hydrophobic polymer is in this connection at least substantially biologically degradable and thermoplastically processable and the mixture with the starch comprising a polymer phase mediator or a macromolecular dispersing agent so that the starch is present in the mixture as disperse phase with the hydrophobic polymer as continuous phase, and the phase mediator or the dispersing agent is responsible for the molecular coupling of the two phases. As starch there is preferably used thermoplastic starch which has been prepared substantially with the exclusion of water by means of sorbitol or glycerol. The production of the biologically degradable polymer mixture is also carried out substantially with the exclusion of water.

42 Claims, 5 Drawing Sheets

U.S. PATENT DOCUMENTS

| | | |
|---|---|---|
| 5,372,877 | 12/1994 | Kannankeril .................. 428/283 |
| 5,382,611 | 1/1995 | Stepto et al. .................... 524/47 |
| 5,389,322 | 2/1995 | Kim et al. ....................... 264/112 |
| 5,393,804 | 2/1995 | George et al. .................. 523/128 |
| 5,397,834 | 3/1995 | Jane et al. ...................... 525/54.1 |
| 5,405,564 | 4/1995 | Stepto et al. ................... 264/115 |
| 5,412,005 | 5/1995 | Bastioli et al. .................. 524/47 |
| 5,415,827 | 5/1995 | Tomka et al. ................... 264/510 |
| 5,427,614 | 6/1995 | Wittwer et al. ................. 106/213 |
| 5,436,078 | 7/1995 | Bühler et al. ................... 428/474.4 |
| 5,462,980 | 10/1995 | Bastioli et al. .................. 524/47 |
| 5,476,621 | 12/1995 | Kustner ........................... 264/53 |
| 5,480,923 | 1/1996 | Schmid et al. .................. 524/47 |
| 5,500,465 | 3/1996 | Krishnan et al. ............... 524/47 |
| 5,512,090 | 4/1996 | Franke et al. .................. 106/154.1 |
| 5,525,281 | 6/1996 | Lörcks et al. ................... 264/101 |
| 5,844,023 | 12/1998 | Tomka ............................. 524/47 |

—— DIFFERENTIAL DISTRIBUTION
----- SUMMATION CURVE

BIOLOGICALLY DEGRADABLE POLYMER MIXTURE

This is a continuation of application Ser. No. 08/819,152, filed Mar. 17. 1997, now U.S. Pat. No. 5,844,023, which is a continuation of U.S. application Ser. No. 08/437,515, filed May 9, 1995, abandoned, which is a continuation of U.S. application Ser. No. 08/147,788, filed Nov. 4, 1993, abandoned.

BACKGROUND OF THE INVENTION

The present invention relates to a biologically degradable polymer mixture, consisting essentially of starch and at least one hydrophobic polymer, a method of producing a biologically degradable polymer mixture consisting essentially of starch and at least one hydrophobic polymer, as well as a single-layer or multi-layer sheet.

For the control the problem of waste, plastics are more and more as time passes being taken into account, not least of all because their proportion in the treatment of waste is constantly increasing as a result of their increasing use as materials and/or semifinished materials or raw materials. In contradistinction to other materials, such as, for instance, glass or metal, the recycling of plastics, although frequently attempted, is very problematical since it is practically impossible to return the very different types of plastics separately, which in itself would be necessary in order to be able to make reasonable again use of the plastics.

For this reason, it must be assumed that larger and larger amounts of plastic must be disposed of, so that the importance of so-called degradable plastics or polymers is increasing. In this connection, there are of particular interest the biologically degradable polymers which are degraded under the action of microorganisms, bacteria, fungi, enzymes or the like, and as low-molecular products scarcely constitute a problem any longer.

The most widely used biopolymers are in most cases based on starch, in which connection, to be sure, starch is scarcely suitable as an industrially usable polymer. Polymer mixtures with starch are known in which the starch or else other biopolymers are used preferably due to their biological degradability, due to their favorable price, and due to the lack of dependence on petroleum products.

The use of biopolymers as industrial plastic is described in various patents. EP-011 82 40, EP-28 24 51, EP-28 89 20, EP-30 44 01, EP-32 65 14, BG-22 14 919 and EP-32 75 05 describe how native starch, gelatin or other biopolymers are modified or destructured so that they can be used as industrial polymers. This is done by extruding or kneading the starch or the biopolymer with the aid of the water absorbed in the biopolymer or the starch, or by addition of further water, in which case, however, the relatively high water content present is extremely undesired, for instance upon the extrusion of the biopolymer which has been destructured in this manner.

In contradistinction to this, it is proposed in PCT/WO90/05161 that native starch be converted into an industrially usable polymer, i.e. into so-called thermoplastically processable starch without water and with the use of addition substances or softeners or swelling agents, such as, for instance, glycerol. The processability and water resistance of this starch polymer is, it is true, substantially better than the starch polymers produced in accordance with the methods of manufacture described above, but the mechanical properties and, in particular, the water resistance are still insufficient for many industrial uses, such as, in particular, the manufacture of sheets.

For this reason, it has been proposed in a large number of patents that the starch be treated with further polymers in order in this way to obtain properties which permit industrial use. Thus, CH-644 880, CH-644 881, DE-PS-24 62 802 and DE-24 55 732 propose subjecting the starch first of all to a surface treatment with additives and then mixing it with thermoplastic polymers, such as polyethylene, etc. In DE-OS-40 38 732 a material is proposed which has a base of starch with the addition of water and plasticizing agents as well as an aqueous polymer dispersion, formed from a thermoplastic polymer.

In contradistinction to the above-mentioned documents, patents such as EP-40 28, 26, EP-40 47, 23, EP-40 47 27, EP-40 27 28, EP-40 73 50, EP-40 97 88, EP-41 78 28, EP-O 32 802, U.S. Pat. No. 3,952,347, U.S. Pat. No. 5,095,054 and AT-365 619, instead of starting from native starch, start from destructured starch, gelatinized starch or plasticized starch, which are mixed with thermoplastic plastics such as polyolefins, polyalcohols, ABS-copolymers, ethylene/acrylic acid copolymers, copolymers of vinyl pyrrolidines, copolymers with amino groups, etc. In the case of all the above-mentioned polymer mixtures, based on starch, the problem arises that the compatibility between starch and the other polymers is insufficient or the phase mixing of the individual polymers is poor. As is known, starch is extremely hydrophilic, while, as a rule, the polymers used for the mixing are hydrophobic. In the final analysis, the biological degradability of all the said polymer mixtures is still insufficient since the degradation time of the polymers used, which generally are synthetic polymers, is much too long, so that one can scarcely speak of biological degradability.

In order to improve the mechanical properties, it is proposed in a number of patents, such as WO90/10671, WO91/02023 and WO91/02025, that the starch be first of all destructured with a high water content and the water content then reduced to less than 6% upon the production of the polymer mixture in the mixing process with an ethylene copolymer. In WO92/02363 it is furthermore proposed to adding a high-boiling plasticizing agent to the polymer mixture, while in WO92/01743 of the same applicant a boron compound is admixed with the polymer mixture. In DE-39 39 721 it is furthermore proposed to add a cross-linking agent in addition to a polyvinyl/alcohol/starch mixture for the production of sheets.

In order to increase the biological degradability, WO88/06609, in its turn, proposes admixing an iron compound as well as a fatty acid to a polymer mixture consisting of polyethylene and starch or modified starch. EP-282 368, in its turn, proposes a biologically degradable mixture prepared from polyurethane, PVC with plasticizer, a carbohydrate such as starch, as well as an aliphatic polyester, polyurethane being suggested inter alia, based on polycaprolactone. In all the above-mentioned documents of the prior art, it is clear that in all cases some properties are improved by the solution selected while others suffer thereby. Thus, a compromise is always made between the properties, such as water resistance, biological degradability, and mechanical properties in order to be able to improve some of these properties.

Thus, for example, in the production of sheets from a polymer mixture, it is proposed, in accordance with a large number of the above-indicated documents, that the non-starch part of polymer present in the proposed mixtures, produced by itself alone as sheet, i.e. developed with accordingly a substantially thinner wall thickness, has a substantially better tear strength than the thicker sheets produced in corresponding manner from the entire polymer mixture. The reason for this lies either in the high absorption of water or else in the poor phase mixing between the different polymers.

In accordance with patents EP-40 05 31 and EP-40 05 32, it is proposed that the starch be treated, similar to WO90/05161, by a high-boiling plasticizer such as glycerol, urea or sorbitol, in order to obtain thermoplastically processable starch, which is then mixed with ethylene/acrylic acid and/or polyvinyl-alcohol copolymers. Sheets prepared from these starch/polymer mixtures have, it is true, a better tear strength but are still excessively sensitive to moisture.

The same is true of starch/polymer mixtures prepared in accordance with WO90/14388, in which glycerol-starch-polyethylene and ethylene-acrylic-acid copolymers are admixed.

In WO91/16375, in its turn, there is proposed for the production of sheets, a polymer blend which uses thermoplastically processable starch in accordance with WO90/05161, together with a polyoletin, as well as a phase or bonding mediator in order to improve the phase mixing between the starch and the polyolefin. Similarly, in the still unpublished PCT/CH92/00091, it is proposed that thermoplastically processable starch be mixed with at least one polyolefin and at least one ethylene-acrylate-maleic anhydride copolymer, the esterification product between the starch and the added copolymer serving as phase mediator between the starch phase and the polymer phase. The advantage of this polymer mixture is that, due to the good mixing of the starch phase with the further polymer phase, such as for instance the hydrophobic polyolefin phase, excellent mechanical properties can be obtained upon the production, for instance, of sheets.

To be sure, all of these polymer mixtures also have the important disadvantage that their biological degradability can in no way satisfy the demands made today as to such degradability.

In connection with biologically degradable polymers, a direction which is targeted away from starch has therefore been pursued for some time, in the manner, for instance, that aliphatic polyesters the polycaprolactone or polyhydroxy-butyric acid/hydroxyvaleric acid copolymers (Biopol) have been developed which can be excellently biologically degraded. The problem with these products, however, resides in the fact that they are very expensive to produce, so that their use as industrial mass-produced plastic does not enter into question.

In this connection, reference may be had to an article in the journal Capital 6/92, p. 208, entitled "Miracle Films Reduce Plastic Rubbish", in which such new developments are described. Another great advantage of these newly developed materials resides in the fact that they are hydrophobic and thus water resistant, this in contradistinction to starch which is very hydrophilic.

This difference brings it about, however, that a "stretching" of the said expensive, biologically degradable polymers with starch involves the problem that two immiscible phases are present. This non-miscibility of starch with the said hydrophobic, biologically degradable polymers, in its turn, has the result that mixed polymers produced in this manner have poor mechanical properties, whereby, once again, the problem discussed originally above is present, namely that compromises must be made between water-solubility, biological degradability, and mechanical properties.

SUMMARY OF THE INVENTION

The object of the present invention is now to propose a solution for the problem discussed above by providing a polymer mixture which has good water resistance, is excellently biologically degradable, and, in addition, gives good mechanical properties, so that use a s mass-produced plastic enters into consideration. Another prerequisite for suitability as mass-produced plastic resides, not least of all, however, also in the price of the polymer mixture proposed for this object being of acceptable amount.

DETAILED DESCRIPTION OF THE INVENTION

Figure 1:
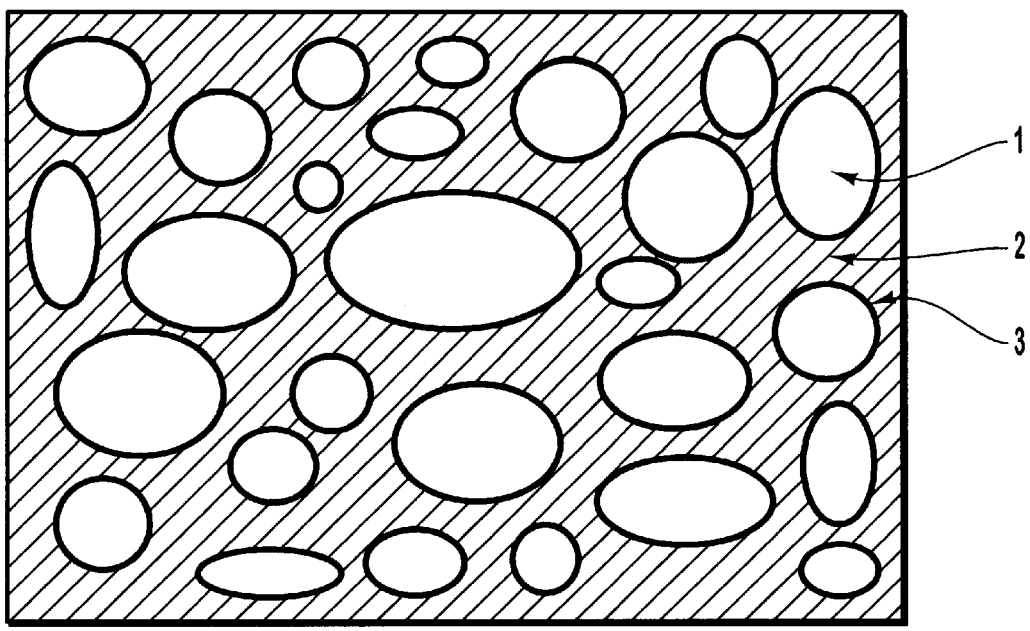
FIG. 1 diagrammatically shows the morphology of a polymer mixture in accordance with the invention.

In accordance with the invention, the object proposed above is achieved by means of a biologically degradable polymer mixture in accordance with the below description.

There is proposed a biologically degradable polymer mixture consisting essentially of starch and at least one hydrophobic polymer, the hydrophobic polymer being at least substantially biologically degradable and being capable of being suitably processed thermoplastically, the mixture furthermore containing a polymer phase mediator and/or a macromolecular dispersing agent, the starch being present as the disperse phase in the mixture with the hydrophobic polymer as continuous phase and the phase mediator or the dispersing agent being responsible for the molecular coupling of the two phases.

The polymer mixture proposed is thus based on the same principle as that set forth in the still unpublished PCT/CH92/00091 in which, surprisingly, the phase mediators proposed in the said international patent application are also suitable for effecting the molecular coupling between the two phases.

Furthermore, similar to PCT/CH92/00091, one preferably proceeds from thermoplastically processable starch such as proposed, for instance, in WO90/05161 or WO91/16375. In analogous manner, it is therefore proposed in accordance with the invention that the starch be present as so-called thermoplastically processable starch (TPS), obtained by mixing native starch, substantially free of water, with at least one plasticizing or swelling agent in an amount of 15 to 40% by weight based on the weight of the mixture, the plasticizing or swelling agent used being adapted to at least partially swell or dissolve the starch or derivative thereof out.

As suitable swelling or plasticizing agent for the production of the thermoplastically processable starch there are suitable, in particular, among other products, sorbitol, glycerol, hydroxy acids such as, for instance, lactic acid and their salts, as well as polyvinyl alcohol. In addition, however, there are also suitable all swelling or plasticizing agents or else addition substances such as used in the two above-mentioned international patent applications for the production of thermoplastically processable starch.

The essential advantage of the polymer mixture produced in accordance with the invention over all known polymer mixtures described in the prior art resides in that, based on starch, a thermoplastically processable industrial "plastic" is present which is substantially insensitive to water since the hydrophobic polymer is present as continuous phase or matrix in the mixture and, on the other hand, the polymer mixture is excellently biologically degradable within a reasonable period of time since the hydrophobic polymer itself is of good biological degradability.

In order now for the hydrophilic starch phase and the hydrophobic polymer phase to have good miscibility or for the starch to be suitably dispersible in the hydrophobic polymer, the phase mediator of the invention or a macromolecular dispersing agent is provided, the phase mediator being possibly on the one hand a block copolymer which comprises at least two blocks, one of which blocks is at least substantially soluble in the hydrophobic polymer phase while the other block is at least substantially soluble in the starch phase.

The phase mediator can, however, also be formed by a reactive additional polymer which is substantially soluble in the hydrophobic polymer phase and comprises groups which are reactive with respect to the starch and react with at least a part of the starch and thus form in the mixture the phase mediator which is responsible for the above-mentioned molecular coupling of the two phases.

In accordance with another variant of the invention, in order to form the phase mediator, one can proceed from a hydrophobic polymer of the above-mentioned type which includes in the molecule chain, ester groups which become reactive at elevated temperature after their decomposition and react, at least in part, with at least a part of the starch or of the thermoplastically processable starch. The molecule chains of the hydrophobic polymer which have thus reacted with the starch or the thermoplastically processable starch form, within the mixture, the phase mediator which, in its turn, is responsible for the molecular coupling of the two phases.

In connection with the polymer mixture produced in accordance with invention, it is essential now, however, that in all cases the thermoplastically processable starch be present as the disperse phase, for which reason the starch can be present only up to a maximum proportion in the mixture, namely up to the proportion in which the hydrophobic polymer is still present as a substantially coherent continuous phase. As soon, for instance, as the two phases are present in the same function in the mixture, i.e. both as continuous phase and disperse phase, the water resistance of the polymer mixture is no longer assured. In practice, it has been found that the thermoplastically processable starch can be present in the polymer mixture up to a proportion of at most 70% by weight, referred to the total weight of the mixture, in which case the starch is still present as a disperse phase. If the proportion of starch selected is too small, the problem again arises that the high price of the hydrophobic, biologically degradable polymer becomes too important. Accordingly, the thermoplastically processable starch is present in the polymer mixture of the invention meaningfully in a portion within the range of between 30 and 70% by weight and preferably 50 to 65% by weight, based on the total weight of the mixture.

As hydrophobic, biologically degradable thermoplastically processable polymers, the following polymers are, in particular, suited:
  cellulose derivatives with a degree of substitution <2, such as cellulose ethers, cellulose esters or cellulose mixed esters;
  aliphatic polyesters, such as polycaprolactone, polyhydroxybutyric acid, polyhydroxybutyric acid/hydroxyvaleric acid copolymers, and polylactic acids;
  hydrophobic proteins, such a zein; and/or
  polyvinyl alcohol, prepared by less than 100% hydrolyzation of polyvinyl acetate, preferably with a degree of hydrolyzation of about 88%.

As example of a cellulose ether, mention may be made of cellulose diethyl ether (CdE), which can be thermoplastically processed, for instance, with diethyl tartrate as plasticizer at about 190° C. and is biologically degradable. The maximum water absorption at 20° C. in water is only just 0.04 parts by weight.

As example of cellulose esters, mention may be made of cellulose diacetate (CdA) or as mixed ester, cellulose acetate butyrate, which can be thermoplastically processed with plasticizers at 180° C. and are biologically degradable. The maximum water absorption at 20° C. in water is only just 0.05 parts by weight.

Both of the above examples of cellulose derivatives are offered today on the market at prices on the order of Swiss Francs 12/kg.

Polycaprolactone can be processed without plasticizer at 120° C.; it is partially crystalline, with a melting point of between 60 and 80° C. and vitreous solidification at −50° C. The mechanical properties are comparable to those of low-density polyethylene. The maximum water absorption at 20° C. is <0.01 parts by weight; furthermore, polycaprolactone is biologically degradable. The prices are on the order of Francs 10 to 12/kg.

Polyhydroxy-butyric acid/hydroxyvaleric acid copolymers are thermoplastically processable, have good mechanical properties and a low water absorption of <0.01 parts by weight and are furthermore readily biologically degradable. Their relatively high price of Francs 30 to 50/kg, on the other hand, limits the use of these polymers.

The same is true of polylactic acid which, although it can be readily thermoplastically processed, has good mechanical properties and is biologically degradable, can scarcely be used since its price is on the order of Francs 1000 to Francs 3000/kg.

As hydrophobic protein, zein is proposed, as it is thermoplastically processable, with 0.2 parts by weight of lauric acid or diethyl tartrate at 130° C. Zein is furthermore biologically degradable and its cost is about Francs 20 to Francs 30/kg. One disadvantage of zein resides in its relatively high water absorption, which is definitely more than 0.1 parts by weight.

Finally, mention may also be made of polyvinyl alcohol, known under the trademark Moviol, the polyvinyl acetate used for the production being advantageously 88% hydrolyzed.

As already mentioned above, it is possible to use two different groups of phase mediators. On the one hand, phase mediators are proposed which are compatible with thermoplastically processable starch and, at the same time, compatible with the hydrophobic polymer. On the basis of the different cohesion energy densities of starch and the hydrophobic polymers, only block copolymers enter into consideration, namely ones which consist of a block soluble in starch and of a block soluble in the hydrophobic polymer phase. It is, of course, essential in this connection that the phase mediator also be biologically degradable and can be suitably processed thermoplastically. As example of this, a polycaprolactone/polyvinyl alcohol copolymer may be mentioned. Such a phase mediator can be added in an amount of up to 100% based on the weight of the hydrophobic polymer, but it is preferably used only in an amount of 5 to 50% by weight of such polymer for the manufacture of the polymer mixture of the invention.

The other group of phase mediators comprises reaction products between a further biologically degradable polymer with starch which has groups reactive with respect to the starch and is compatible with the hydrophobic polymer phase, these reactive groups possibly comprising, for instance, epoxy groups or else acid-anhydride groups. These reactive groups now react with a part of the starch and thus form in the polymer mixture the phase mediator which is responsible for the molecular coupling of the two phases.

Such a phase mediator can, in its turn, be present in the polymer mixture in an amount of up to 100% by weight, based on the weight of the hydrophobic polymer, the polymer mixture preferably having a proportion of phase mediator of 5 to 50% by weight based on the weight of the hydrophobic polymer.

The further polymer used for the production of this type of phase mediator can be a hydrophobic polymer, taken from the above-indicated list of hydrophobic polymers which are used in the polymer mixture. In this connection, one of the said polymers is provided with reactive groups, such as, for instance, epoxy groups or acid-anhydride groups, which then react with the starch upon the production of the polymer mixture. In principle, it would, of course, be conceivable for the hydrophobic polymer to be replaced completely by such a further polymer, whereby, in the final analysis, the polymer mixture would consist only of thermoplastically processable starch and the phase mediator.

The introduction of the reactive groups is effected in this connection in the manner that the reactive groups are grafted on a hydrophobic polymer, such as, for instance, a polymer in accordance with the above-indicated list, by means of vinyl polymerization or condensation, this being achieved in the case of the epoxy groups by a glycidyl ether and in the case of acid-anhydride groups for instance by succinic anhydride. Of course, it is, however, also possible to provide other reactive groups which can react with the starch molecules.

In contradistinction to this, it is, however, also possible to produce a polymer blend defined in accordance with the invention upon the production of which an externally added phase mediator can be dispensed with in the manner that the phase mediator forms itself during the production of the polymer mixture. In this connection, it is proposed, in accordance with the invention, that as hydrophobic polymer there be used a polymer having ester groups which are installed in its molecule chains and which, at elevated temperature, after decomposition, become reactive and thus effect transesterification of the hydrophobic polymer and also, occurring in part as quasi further polymer, react with a part of the starch or of the thermoplastically processable starch. The reaction products of the molecule chains which thus react with the starch then form the phase mediator which is again responsible for the molecular coupling of the two phases. Naturally, it would theoretically be possible for all molecule chains of the hydrophobic polymer to react with the starch, but it can as a rule be assumed that the transesterification reaction takes preference over the esterification reaction with the starch, whereby only a part of the hydrophobic polymer is converted into phase mediator. Again, the phase mediator will be present in the final polymer blend in an amount of about 5 to 50% by weight, based on the total weight of the hydrophobic polymer.

As example of this, mention may be made of polycaprolactone, which contains in the molecule chains ester groups which, for instance, can presumably enter into the above-mentioned transesterification reaction with the starch at a temperature of about 190° C.

Generalizing, it results in particular from what has been stated above that in the polymer mixture of the invention, the phase mediator can be formed of starch or thermoplastically processable starch with aliphatic polyester grafted thereon, obtained for instance by reaction of polycaprolactone with the starch. In this connection, it has been found that the more starch having grafted polyester present, the more the water resistance of the polymer mixture can be increased.

The polymer mixtures proposed in accordance with the invention can, of course, be provided with any desired additives, additions, fillers, pigments, etc., such as generally known in the case of polymers and, in particular, in the case of thermoplastically processable plastics. Since their addition is strongly dependent on the use intended and since, furthermore, such additions are well known from practice, their use in connection with the polymer mixtures defined in the invention will not be taken up in detail, with the exception of plasticizers. It is self-evident that, in view of the requirement of biological degradability of the polymer mixtures, this property must also be paid the necessary attention upon the use of such additions and additives, since otherwise the biological degradability would naturally suffer thereby.

As additive, mention may be made, in particular, of the admixing of a plasticizer which is compatible with the hydrophobic polymer and preferably reduces its melt viscosity. On the one hand, the advantage of a plasticizer is that the hydrophobic, biologically degradable polymer is made less brittle by the plasticizer and furthermore, upon the production of the polymer blend, the quasi encapsulation of the thermoplastically processable starch by the hydrophobic phase is favored by the reduction of the viscosity.

A method which is particularly suitable for the production of the above-mentioned biologically degradable polymer mixtures of the invention is described herein.

For the production of the biologically degradable polymer mixture of the invention, one can start either from native starch or from thermoplastically processable starch, such as defined, for instance, in international patent application WO90/05161.

In the event that one starts from native starch, it must, of course, first of all be digested with the use of at least one plasticizing or swelling agent, in which connection the native starch should have for this digestion a water content of <10% and preferably <6% by weight. To be sure, a certain water content of the said order of magnitude of up to 6% by weight can definitely be advantageous for the digestion of the native starch for instance with glycerol or sorbitol. Thereupon, the mixture prepared in this manner is melted to form a thermoplastically processable starch and mixed mechanically, in which connection the water content, however, must now be reduced to less than 1% by weight and preferably to <0.5% by weight, based on the total weight of the mixture, and the mixing then continued until a homogeneous mass is obtained.

The thermoplastically processable starch is now mixed in the melt together with at least one biologically degradable hydrophobic polymer which is thermoplastically processable and with a phase mediator or a dispersing agent or another polymer soluble in the hydrophobic polymer phase having groups which are reactive to starch, the water content, before or upon the mixing of the said components being reduced to less than 1.0% by weight and preferably <0.5% by weight, based on the total weight of the mixture in order in this way to obtain the biologically degradable polymer mixture defined in accordance with the invention, in which connection, in the case of the use of a further polymer, the polymer mediator in the polymer mixture is formed by reaction of this further polymer with a part of the thermoplastically processable starch.

It is important that the production of the polymer blend take place with the substantial exclusion of water, since, otherwise, the dispersing of the starch in the hydrophobic polymer under the action of the phase mediator would not take place properly. Thus, for instance, the acid anhydride groups in the presence of water do not react with the starch to form the phase mediator but, rather, hydrolyze. Thus, the formation of the phase mediator is prevented, whereby, as mentioned, a dependable dispersing is made impossible. The presence of a substantially good dispersion in the polymer blend is, however, a prerequisite for the good mechanical properties of the mixture desired in accordance with the invention. Furthermore, there is the danger of the formation of bubbles upon the processing of the polymer mixture. Drying of the polymer blend after its production is not able subsequently to improve a polymer mixture which has been defectively produced as a result of moisture.

For the preparation of the polymer mixture of the invention, up to 70% by weight, based on the total weight of the mixture, of thermoplastically processable starch can be used in order to make certain that, as required above, the hydrophobic polymer is still present substantially as the continuous phase. The remaining portions in the polymer mixture of the invention are taken up, on the one hand, by the hydrophobic polymer and, on the other hand, by the phase mediator which, based on the weight of the hydrophobic polymer phase, can constitute 2 to 100% by weight, and preferably 5 to 50% by weight. Accordingly, upon the production of the polymer mixture, either 2 to 100% by weight, based on the weight of the hydrophobic polymer phase, of a phase mediator is added, or else, however, the same weight percent of another polymer which comprises the reactive groups in order to form the phase mediator in the polymer mixture by reaction with parts of the starch.

While for the production of the thermoplastically processable starch, the starch is mixed with the swelling or plasticizing agent in a temperature range on the order of 150 to 190° C., the mixing of the thermoplastically processable starch with the hydrophobic polymer and the phase mediator or the further polymer takes places in a temperature range of about 150 to 230° C. The mixing temperature to be selected depends in this connection essentially on the processing temperature of the hydrophobic polymer selected, for which reason, for instance, when using cellulose derivatives, a temperature on the order of magnitude of 190 to 220° C. is rather used, while when using polycaprolactone, the production of the polymer mixture of the invention is preferably effected within a range of about 150° C. to 190° C. With respect to the hydrophobic polymers to be used, reference is had to the list of suitable hydrophobic polymers given in connection with the characterizing of the polymer mixtures of the invention.

Similarly, as already stated upon the characterizing of the different polymer mixtures of the invention, in principle, polymer mixtures with two different types of phase mediators can be produced. In accordance with a first variant, the thermoplastically processable starch is treated with preferably 5 to 50% by weight, based on the weight of the hydrophobic polymer, of a block copolymer as phase mediator, the phase mediator consisting of at least one block soluble in the starch phase and one block soluble in the hydrophobic polymer phase, such as, for instance a polycaprolactone/polyvinyl-alcohol copolymer, in which connection, finally, together with the phase mediator, the at least one hydrophobic polymer, such as, for instance, polycaprolactone, is admixed. Of course, other phase mediators than the one indicated above can also be used, such as, for instance, partially hydrolyzed polyvinyl acetate or a polyvinyl acetate/polyvinyl pyrrolidone block copolymer; it is essential in this connection that the phase mediator used contains at least two blocks, which are soluble respectively in the two phases.

In the other case, either the reactive groups are either first of all grafted on the hydrophobic polymer suitable for the production of the polymer mixture of the invention by means of vinyl polymerization or condensation by reaction with a glycidyl ether of at least one aliphatic di- or polycarboxylic anhydride such as, for instance, succinic anhydride, in which case the further polymer thus formed together with the hydrophobic polymer and thermoplastically processable starch are mixed intensively in the melt with a water content of <0.5 and preferably <0.1%. Or else, a hydrophobic polymer is used having ester groups incorporated in its molecule chains, the ester groups becoming reactive after decomposition at elevated temperature and thus leading to a transesterification of the hydrophobic polymer and also, occurring intermediarily as further polymer, reacting in part with a part of the starch or of the thermoplastically processable starch in order to form the phase mediator. In corresponding manner, a hydrophobic polymer having ester groups incorporated in its molecule chains is also intensively mixed with the thermoplastically processable starch in the melt and with the above-mentioned low water content. This mixing is effected, for instance, in a plastic processing apparatus or machine such as a kneader or an extruder, the reactive groups of the said further polymer or the decomposing installed ester groups reacting, upon this mixing process, with a part of the starch or of the thermoplastically processable starch for the production of the phase mediator. It is essential, in this connection, that upon the use of a further polymer having the reactive groups, there be a polymer which is substantially soluble in the hydrophobic polymer phase or readily miscible with it. When using a polymer with ester groups installed in its molecule chains, this is automatically obtained.

For the production of a further polymer, one can start, for instance, from ethyl cellulose which is mixed with oleic acid or, in general, with an unsaturated fatty acid or a corresponding triglyceride. By means of radical reaction of the vinyl groups, the maleic anhydride groups are grafted on the ethyl cellulose, which anhydride groups, as mentioned above, are capable of reacting with the starch in order, in this way, to form the phase mediator.

As example of a hydrophobic polymer having ester groups installed in its molecule chains, mention may be made of polycaprolactone, the ester groups of which permit transesterification reactions with the starch as from a certain temperature.

In accordance with another variant embodiment of the invention, it is possible to produce a polymer mixture according to the invention by mixing thermoplastically processable starch with a hydrophobic polymer which consists, at least almost exclusively, of macromolecules which have groups reactive with the starch. In this case, the hydrophobic polymer and the phase mediator in the polymer mixture of the invention are substantially identical. To be sure, in this case also, the hydrophobic polymer or the phase mediator must, of course, be present in such proportion in the polymer mixture that, as the required in the invention, the starch is still present as the disperse phase with the hydrophobic polymer or the phase mediator as continuous phase, in which connection the molecular coupling of the two phases is present due to the bonds between the hydrophobic polymer and a part of the starch molecules.

To get back to the above-mentioned example of the ethyl cellulose converted by oleic acid, there is used, accordingly, for the production of the polymer blend, exclusively ethyl cellulose which has appended maleic anhydride groups. Depending on the selected processing temperature, mixture ratio and processing time, more or less phase mediator is formed, in which connection, as mentioned, it must be seen to it in all cases that the starch is still present as the disperse phase. From the standpoint that the hydrophobic polymer and the further polymer are substantially identical, there can naturally also be included the case, as mentioned, in which the hydrophobic polymer contains ester groups installed in its molecule chains.

In accordance with the a further variant of the method of the invention, it has been found advantageous if the hydrophobic polymer is treated with a plasticizer before mixing with the starch or the thermoplastically processable starch. In this connection, it is advantageous if the plasticizer selected is at least substantially compatible only with the hydrophobic polymer, i.e. is soluble only in the hydrophobic phase. Furthermore, it has proven advantageous if the selected polymer reduces the melt viscosity of the hydrophobic polymer. The assumption is obvious that the formation of a dispersion with the starch as the disperse phase and with the hydrophobic polymer as the continuous phase is further favored if the hydrophobic polymer is treated with a plasticizer which reduces its melt viscosity. As a rule, as is known, the phase with the lower viscosity in a dispersion forms the continuous phase.

In connection also with the method defined in accordance with the invention, the description of filled, colored, reinforced polymers, etc. is also dispensed with since the preparation of such polymer mixtures is well known in the plastics processing industry.

The biologically degradable polymer mixtures defined above in accordance with the invention are suitable for both injection molding and extrusion application, reference being had here, in particular, to the production of single or multi-layer sheets. In this connection, at least one layer of such a sheet consists of a polymer mixture according to the invention. There is therefore conceivable a single-layer sheet produced entirely from a polymer mixture of the invention or else, for instance, a three-layer sheet comprising a central middle layer, produced, for instance, exclusively from thermoplastically processable starch while the two outer layers which cover the layer of starch can be prepared from a polymer mixture such as defined in the invention. In this way, there can be produced a substantially water-resistant sheet which consists of a total of 80% by weight or even more of thermoplastically processable starch and which, as a whole, satisfies the demands made as to biological degradability.

The invention will now be described in further detail below, in part with reference to the accompanying figures and on basis of theoretical considerations and practical examples.

DETAILED DESCRIPTION OF THE INVENTION

Figure 2:
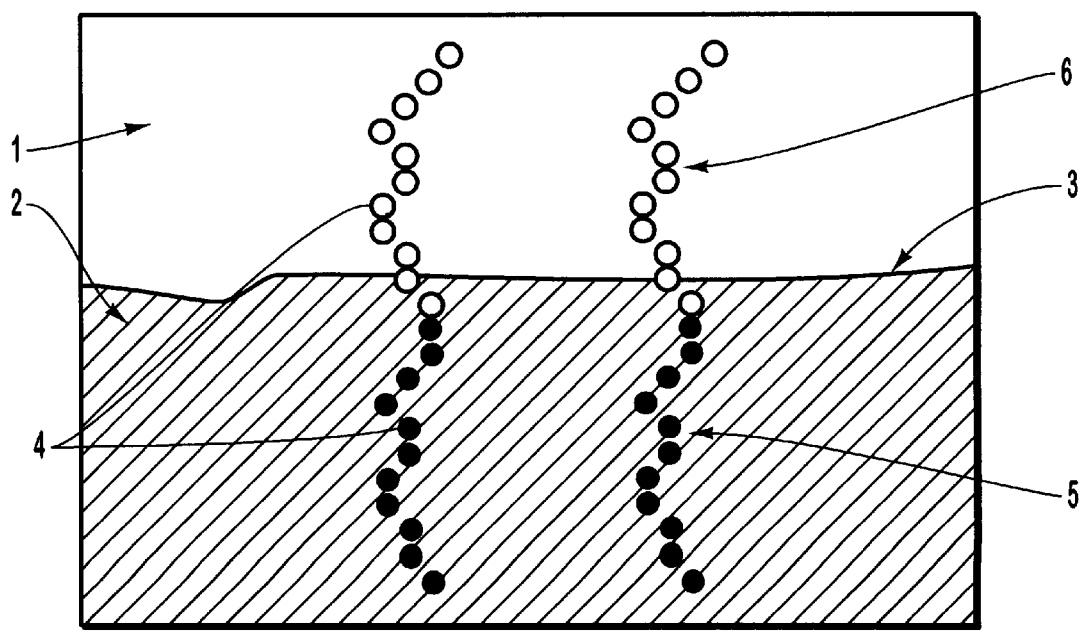
FIG. 2 diagrammatically shows the mechanism of the phase mediation in a polymer mixture according to the invention.

First of all, referring to FIGS. 1 and 2, there will be briefly discussed the basic problem or object of the present invention which has led to the preparation of the polymer mixtures defined in the invention.

The incompatibility of the thermoplastically processable starch with hydrophobic polymers can be used, as shown diagrammatically in FIG. 1, in order to disperse them in a matrix consisting of a hydrophobic material. With this structure, it is to be expected that the swelling of the thermoplastically processable starch upon storage under water or the water vapor sorption can be effectively limited. The diagram shown of the morphology of a polymer mixture in accordance with the invention shows, on the one hand, the thermoplastically processable starch 1 as disperse phase and the hydrophobic polymer 2 as continuous phase.

The boundary surface 3 present in this connection is shown greatly enlarged, diagrammatically, in FIG. 2. The disperse distribution of the thermoplastically processable starch 1 in the hydrophobic polymer 2 is made possible under the action of the phase mediator 4, which phase mediator 4 comprises a segment 6 which is miscible with the thermoplastically processable starch 1 and a segment 5 which is miscible with the hydrophobic polymer 2. The phase having the lower viscosity in this connection, as a rule, forms the continuous phase, for which reason it may be indicated to add a viscosity-reducing additive, such as, for instance, a plasticizer, to the hydrophobic polymer. In this connection, it is advantageous for this plasticizer to be compatible only with the hydrophobic phase in order in this way to effect a reduction of the viscosity specifically in the hydrophobic phase.

The exact particle size of the individual phases, as shown in FIG. 1, is determined by the rheological behavior of the individual phases, the nature of the mixing process, and the interfacial energy. Based on the thermodynamically caused incompatibility of the thermoplastically processable starch with the hydrophobic polymer, only a slight intermixing of the two polymers takes place at the phase boundary, which as a rule leads to an impairment in the mechanical properties of a mixture of the two substances. For this reason, it is necessary that a sufficient mechanical coupling of the two phases or a low interfacial energy be obtained, which can be achieved by the use of the block copolymer or phase mediator shown diagrammatically in FIG. 2. This phase mediator penetrates through the phase boundary 3. As a rule, these phase mediators consist of two blocks each sufficiently compatible with one of the two polymers respectively.

The preparation of polymer mixtures defined in accordance with the invention will now be explained in further detail on the basis of the following examples, in which connection the above-indicated fundamental theoretical consideration are taken into consideration in order to obtain the good properties desired in accordance with the object of the invention for a thermoplastically processable, biologically degradable polymer mixture.

1. Polymer Mixture of Cellulose Acetate Butyrate and Thermoplastically Processable Starch As cellulose ester, cellulose acetate-butyrate (ZAB) was mixed together with thermoplastically processable starch (TPS) in a Brabender kneader at 160° C. with different mixture ratios. As TPS there was used a starch which is reacted with 30% by weight glycerol, this being done in accordance with the processing conditions disclosed by way of example in WO90/05161 or in WO91/16375. Tenite Butyrate 525 of Eastman Kodak was used as cellulose ester/butyrate mixed ester.

The two polymers were first of all mixed without any additions in the range of 30 parts by volume of ZAB to 80 parts by volume of ZAB, the balance being TPS, and on basis of pressed plates prepared therefrom the swelling in water was investigated and tensile tests carried out on basis of test specimens. In this connection, it was found that as from about 55 percent by volume of ZAB the swelling was still only slight and furthermore the test specimens had experienced an increase in weight, which permits the conclusion that the TPS phase could no longer be extracted from the test specimens.

The values for elongation at rupture and rupture work can be noted from Table 1.1 below. In this connection it can be noted that, as a function of the percentage by volume of the ZAB, the rupture work and the elongation at rupture pass through a minimum at a percent by volume of ZAB of about 50 to 60, the rupture work increasing approximately twenty times at 80 percent by volume. It can be concluded from this that in this range the transition from TPS to ZAB is present as continuous phase. Upon the simple mixing of TPS and ZAb, there is thus obtained merely a drastic impairment in the mechanical properties; this is undoubtedly due to the insufficient dispersion of the TPS phase in the ZAB matrix and to very poor mechanical coupling of the phases.

TABLE 1.1

| Percent by Volume ZAB Work (% $V_{tot}$) | Elongation at Rupture (%) | Rupture (kJ/mm$^2$) |
| --- | --- | --- |
| 30% | 10% | 10 |
| 40% | 10% | 37 |
| 50% | 8% | 35 |
| 60% | 4% | 28 |
| 70% | 6% | 66 |
| 80% | 37% | 800 |

Rupture work and elongation at rupture of TPS/ZAB blends as a function of the percent by volume of ZAB; prepared at kneading temperature of 160° C.; tensile tests carried out on 0.3 mm pressed plates.

Since, in the case of incompatible polymer mixtures, the continuous phase is formed by the component having the lower viscosity, as in our case the hydrophobic polymer or the ZAB, a plasticizer which is only compatible with the ZAB phase and thus selectively reduces its viscosity was now added to the mixture. In this way, a better dispersion of the TIPS phase was to be obtained. As plasticizer, acetyl triethyl citrate (ATZ) was used because of its biological degradability. Mixtures were prepared with an amount of TPS of 40% by volume, with variation of the volumetric ratio of ATZ to ZAB, the mechanical properties obtained being set forth in Table 1.2 below:

TABLE 1.2

| % by Volume ATZ (% $V_{tot}$) | % by Volume ZAB (% $V_{tot}$) | Elongation at Rupture (%) | Rupture Work (kJ/mm$^2$) |
| --- | --- | --- | --- |
| 8.3% | 91.7% | 40% | 670 |
| 20% | 80% | 50% | 620 |
| 25% | 75% | 61% | 450 |

TABLE 1.2-continued

| % by Volume ATZ (% $V_{tot}$) | % by Volume ZAB (% $V_{tot}$) | Elongation at Rupture (%) | Rupture Work (kJ/mm$^2$) |
| --- | --- | --- | --- |
| 33% | 67% | 61% | 270 |
| 42% | 58% | 70% | 160 |

Rupture work and elongation at rupture of TPS/ZAB/ATZ blends as a function of the percent by volume of ATZ in the ATZ/ZAB phase. Mixture prepared with a kneading temperature of 160° C.; tensile tests carried on 0.3 mm pressed plates.

With 8.3% ATZ in the ZAB phase there is already obtained an increase in the rupture work by twenty times as compared with a specimen without ATZ but otherwise the same amount of TPS (40 Vol. %), in which connection the material can be elongated up to 70%. On the basis of a scanning electron microscope photograph of the polymer mixtures containing a proportion of ATZ of 25% by volume in the ZAB phase, it could be shown that the desired morphology had been obtained and ZAB forms the continuous phase. To be sure, it could be noted from the photograph of the polymer mixture that the size of the TPS microphases was still considerable and the dispersion obtained insufficient. This can also be noted from Table 1.2, where the mechanical properties with a percentage by volume of 75% ZAB are insufficient.

A further improvement in the mechanical properties was now obtained by incorporating a phase mediator in the polymer mixture as proposed in accordance with the invention. Upon the preparation of the polymer mixture of ZAB an d TPS in accordance with the invention, epoxidized soy oil was added, it serving at the same time as plasticizer from the ZAB phase. The mechanical properties measured for specimens with 40% by weight TPS are se t forth in Table 1.3.

TABLE 1.3

| % by Volume ESO (% V/$V_{tot}$) | % by Volume ZAB (% V/$V_{tot}$) | Elongation at Rupture (%) | Rupture Work (kJ/mm$^2$) |
| --- | --- | --- | --- |
| 8.3% | 91.7% | 20% | 600 |
| 20% | 80% | 53% | 620 |
| 25% | 75% | 92% | 880 |
| 33% | 67% | 93% | 790 |
| 42% | 58% | 94% | 600 |

Rupture work and elongation at rupture of a blend of (1) 40% V/$V_{tot}$ TPS, (2) 60% V/$V_{tot}$ ZAB/EOS. the volumetric percentages in the table refer to the ZAB/EOS phase; rupture work and elongation were determined on 0.3 mm pressed plates, blend prepared at 160° C. in a Brabender kneader.

From this table it can be noted that by the addition of epoxidized soy oil, the rupture work can be clearly increased as compared with ATZ. A scanning electron microscope photograph of the polymer blends thus prepared shows furthermore that the microphases of the TPS are substantially smaller and still have a size of only about 3 to 4 $\mu$m, in contrast to the TPS microphases in blends containing ATZ, where the size of these phases is in part 15 $\mu$m. As compared with the blends with ATZ as plasticizer, a reduction in the diameter of the dispersed TPS microphases by a factor of 3 to 4 can thus be obtained with the use of epoxidized soy oil. This, in its turn, means an increase in the total boundary surface between the two phases by the same factor of 3 to 4. Since even with an optimal selection of the melt viscosities of two incompatible blends, a mechanical dispersion on this length scale can scarcely be obtained, it must therefore be assumed that the epoxidized soy oil, in addition to its function as plasticizer of ZAB, has also effected a reduction in the interfacial energy between the two phases. This can have been obtained only in the manner that the epoxy groups reacted in part with starch molecules and thus produced the phase mediator claimed in accordance with the invention.

The best mechanical properties were obtained with a blend consisting of 40% TPS, 15% epoxidized soy oil, and 45% ZAB (percentage by volume), the determination of the degree of swelling based on pressed plates of a thickness of 0.3 mm after storage at 24° in water showed stable behavior, i.e. the plates do not fall apart. The swelling amounted to merely 9%, whereby the goal was obtained that TPS has been included in a matrix of a hydrophobic polymer.

The polymer blend produced in this manner can be produced practically 100% from after-expanding raw materials, whereby a material has been developed the components of which are substantially biologically degradable.

Upon the preparation of polymer mixtures from cellulose acetate-butyrate mixed ester and thermoplastically processable starch, it could therefore be shown that, with the selection of a suitable phase mediator, blends of good mechanical properties are obtained, the required morphology, i.e. an encapsulating of the TPS phase in the ZAB matrix, being achieved. Moldings from this material remain stable upon storage in water and exhibit only very limited swelling. Particularly with epoxidized soy oil, it was possible to produce a blend having excellent properties. In this connection, a morphology was obtained which is characterized by a size of the TPS microphases of less than 2 to 3 $\mu$m. As mentioned above, it is therefore to be assumed that the epoxidized soy oil not only influences the viscosity of the ZAB phase but also effects a certain reduction in the interfacial energy between the two phases. A chemical reaction (ether formation) of the epoxy groups with the starch is therefore to be assumed. A chemical modification of the starch at the phase boundary has thus been obtained, whereby a certain compatibility with the ZAB phase has been brought about.

2. Polymer Blend, Prepared from Thermoplastically Processable Starch and Polycaprolactone Polycaprolactone (PCL) has proven suitable for the preparation of polymer blends with thermoplastic starch (TPS). Polycaprolactone is a homopolymer of $\epsilon$-caprolactone and, according to the manufacturer (Union Carbide), is completely biologically degradable and non-toxic and suitable for the preparation of sheets and as polymer additive.

For the preparation of different polymer blends, three different types of TPS were used, designated below as glycerol-TPS, standing for a thermoplastically processable starch containing 30% by weight glycerol; as TPS-LSM 1 standing for a thermoplastically processable starch containing 15 by weight glycerol and 15% by weight sorbitol; and as TPS-LSM2 standing for a thermoplastically processable starch containing 30% by weight sorbitol.

All three types of TPS were extruded, together with caprolactone, in a ratio of 1:1, the two types PCL 787 and PCL 767E of Union Carbide being used for the tests carried out.

In order to provide conditions which were as free as possible of water upon the extrusion, the thermoplastically processable starch was atmospherically degassed before the addition of the polycaprolactone, whereby the water content was clearly reduced to less than 0.5% by weight. The extrusion was carried out on a Theysohn twin-screw extruder, specimens having different temperature profiles being produced for each mixture. On the average, approximately the following temperature profile in the extruder was selected:

80 to 160°/160 to 170°/180 to 190°/150 to 180°/130 to 140°/130°/100 to 140°.

The throughput of the different polymer mixtures was varied between 20 kg/hr and 40 kg/hr. The speed of rotation in the extruder was selected within a range of between 170 and 300 rpm. The energy introduced thus gave a value of about 270 to 440 W/kg of polymer mixture. The measured water content was 0.26 to 0.6% by weight $H_2O$.

Sheets were then formed by blow molding from the polymer mixtures prepared with the three types of TPS and the two types of PCL, in which connection, due to the low melting point of the PCL (about 60° C.), the take-up rolls had to be cooled or, even better, the sheets were produced by pulling up. Tensile tests were carried out with the sheets produced in this manner in order to measure inter alia the tear strength and rupture energy. In this connection, the sheets were tested both after conditioning for 24 hours at room temperature and after 24 hours stored in water.

Figure 3:
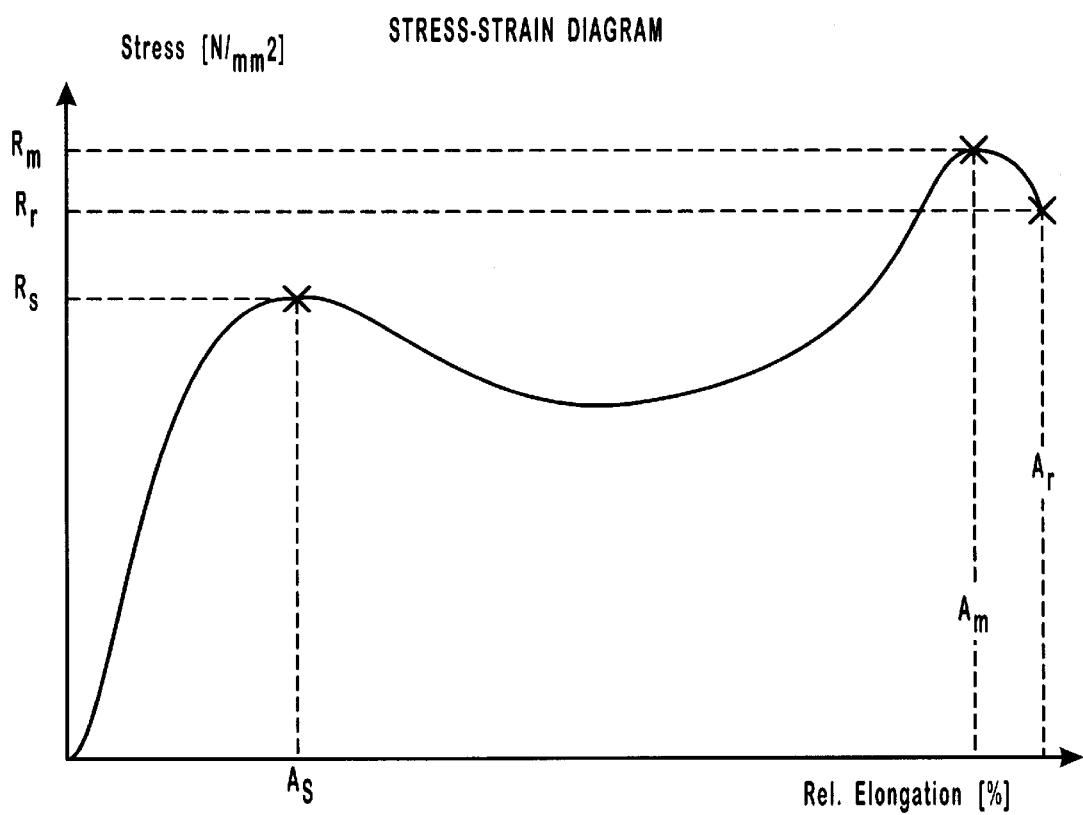
FIG. 3 diagrammatically shows a representative stress-strain diagram for the determination of the mechanical properties of test bodies prepared by means of the polymer mixture of the invention.

In order better to interpret the measured values of the tensile test set forth below in Table 2.1, reference is had, first of all to FIG. 3, in which a stress-strain diagram is shown. The abbreviations used in said FIG. 3 are defined in the following list:

| | |
|---|---|
| Rs | Yield stress |
| As | Relative elongation at the yield stress |
| Rm | Maximum stress |
| Am | Relative elongation at maximum stress |
| Rr | Tear stress |
| Ar | Relative elongation upon rupture |

Furthermore, in the following Table 2.1, the abbreviations have the following meaning:

| | |
|---|---|
| d | Thickness of the sheet |
| b | Width of the sheet for all sheets evaluated = 15.0 mm |
| so | Cross section of the sheet (reference value for the stress) |
| W | Rupture work (proportion to the area below the curve in FIG. 3) |
| N | Identification of the specimen of sheet measured |

Herein:

| | |
|---|---|
| N = 1 | Sheet produced from glycerol-TPS and PCL, the measured values shown in Table 2.1 each being an average value averaged over the values measured for different specimens, prepared, on the one hand, with the two PCL types 787 and 676 E and under the above-indicated different extrusion conditions. |
| N = 2 | Specimens for glycerol TPS and PCL, after storage in water for 24 hours. |
| N = 3 | Specimens of TPS, LSM 1 and PCL, conditioned for 24 hours at room temperature. |
| N = 4 | Specimens from TPS, LSM 1/PCL after storage in water for 24 hours. |

| N | = 5 | TPS, LSM 2 and PCL, conditioned at room temperature for 24 hours, and |
|---|---|---|
| N | = 6 | TPS, LSM 2 and PCL after storage in water for 24 hours. |

TABLE 2.1

| N | Rs N/mm² | As % | Rm N/mm² | Am % | Rr N/mm² | Ar % | d μm | SO mm² | W J/m² | E-Mod. N/mm² |
|---|---|---|---|---|---|---|---|---|---|---|
| 1 | 10.4 | 25.5 | 25.5 | 781 | 25.7 | 782 | 47.0 | 0.72 | 5.30 | 220 |
| 2 | 13.5 | 5.8 | 14.1 | 5.0 | 14.0 | 6.0 | 45.0 | 0.68 | 0.11 | 630 |
| 3 | 15.4 | 7.9 | 19.2 | 607 | 19.2 | 607 | 22.3 | 0.35 | 4.35 | 603 |
| 4 | 18.6 | 10.2 | 20.1 | 290 | 17.9 | 317 | 19.9 | 0.32 | 3.17 | 359 |
| 5 | 19.0 | 10.3 | 21.7 | 615 | 20.7 | 685 | 92.2 | 1.38 | 6.52 | 717 |
| 6 | 12.7 | 13.0 | 22.4 | 675 | 18.0 | 785 | 90.7 | 1.21 | 7.08 | 468 |

As can be noted from Table 2.1, the glycerol blend in dry state has a tear strength of about 25 N/mm² and a rupture energy of about 5 J/m². After 24 hours in a waterbath, the tear strength, however, decreases to about 14 N/mm² and the rupture energy even clearly to below 1 J/m². This great decrease in the mechanical values may be due to the washing out of glycerol.

As compared with this, the sheet prepared from TPS LSM 1 and PCL in dry state has a tear strength of about 19 N/mm² and a rupture energy of about 4 J/m². Even in "soaked" state, the corresponding measured values differ only insignificantly from the values indicated; only the rupture energy drops to about 3 J/m².

The sorbitol sheet tears at about 21 N/mm² with a rupture energy of about 6.5 N/mml. These values do not change even after 24 hours in a waterbath, i.e. they tend rather to increase.

By way of comparison, it may furthermore be mentioned that sheets prepared from pure polycaprolactone have a tear strength of about 18 to 20 M/mm² and a rupture energy on the order of magnitude of 7 to 9 J/m².

The polymer mixtures prepared with thermoplastic starch and polycaprolactone in a ratio of 1:1 on a twin-shaft extruder are suitable both for injection molding, flat-sheet extrusion, and the blowing of sheets. In particular, the polymer mixtures prepared with the sorbitol starch show excellent mechanical properties, so that, based on the above-indicated theoretical considerations concerning polymer mixtures containing two different phases, it must be assumed that a mechanical coupling of the two phases is established at the boundary surfaces.

It was therefore to be assumed that the ester groups in the polycaprolactone which are installed in the molecule chains enter into esterification reactions with the thermoplastic starch, whereby the molecule chains which thus react again form with the starch the phase mediator mentioned in accordance with the invention. This assumption was confirmed by the fact that transesterification reactions take place in the polycaprolactone starting from a given temperature, which it was possible to verify by molecular-weight distributions. This circumstance will be explained in further detail with reference to the molecular weight distributions shown in FIGS. 4 and 5.

Figure 4:
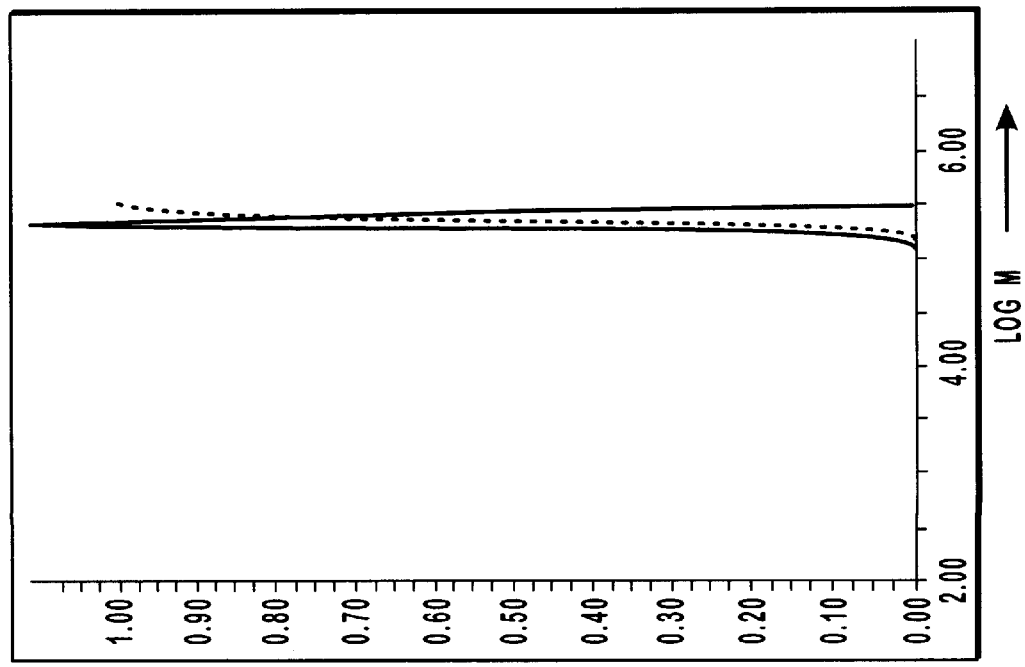

FIG. 4 shows a differential molecular weight distribution of poly-epsilon-caprolactone P787 of Union Carbide Corporation which was not subjected to prior treatment. The average molecular weight obtained is in this connection 215,500, the minimum measured molecular weight 212,400, and the maximum molecular weight ascertained 218,600.

The polycaprolactone used for the determination of the curve in FIG. 4 was then heated to 190° C. and then cooled. The molecular-weight distribution was again measured, it being now shown in FIG. 5. Already on basis of the showing in FIG. 5, it can clearly be noted that the molecular weight distribution is considerably broader, whereby it already is clear that an internal rearrangement of the molecule chains has taken place. Due to the ester groups present in the molecule chain, a transesterification reaction has taken place.

Figure 5:
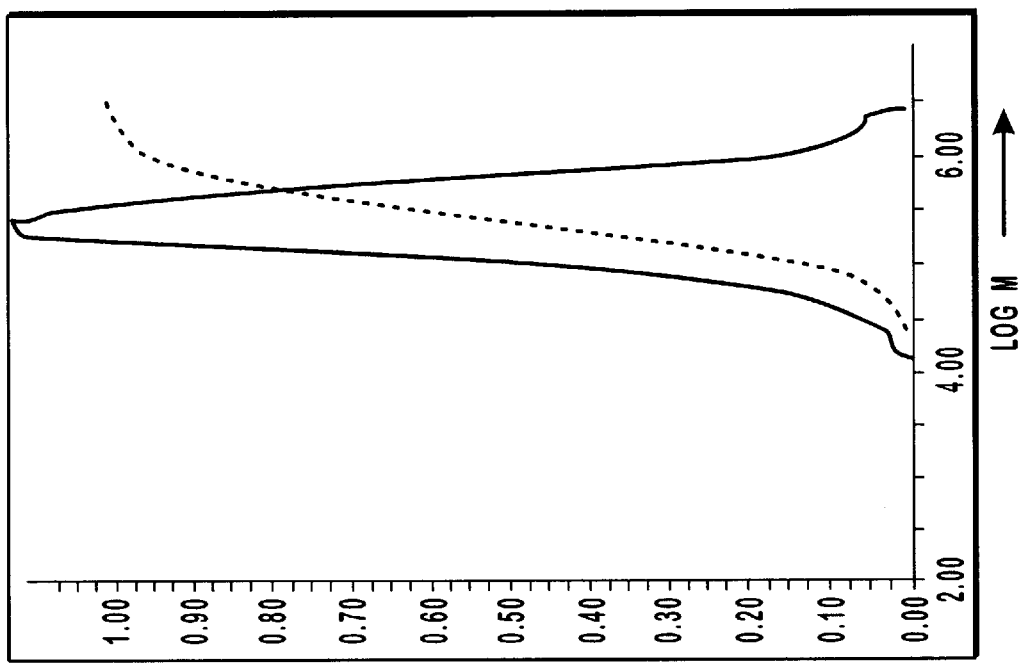
FIGS. 4 and 5 show molecular weight distributions of poly-caprolactone, not previously treated and pretreated by means of esterification.

The values determined on the basis of the distribution of FIG. 5 gave the following picture:

| Weight average of the molecular weight: | 280,000 |
|---|---|
| Maximum molecular weight: | 538,400 and |
| Minimum molecular weight: | 146,300. |

Since the internal transesterification reaction of the molecule chains in the polycaprolactone are in competition with corresponding esterification reactions with the starch, it is clear that, in this way, upon the working of the polycaprolactone with the thermoplastic starch, a part of the polycaprolactone reacts with the starch, as a result of which, as required in accordance with the invention, the phase mediator is formed which is responsible for the molecular coupling of the two phases. The presence of reaction products between polycaprolactone molecule chains with the TPS could finally be proven on basis of a heat-flow diagram, whereby the above-indicated assumption could be finally proven.

3. Measurement of the Biological Degradability or Compostability of a Polymer Mixture Prepared by Way of Example in Accordance with the Invention The polymer mixture in accordance with the invention which is used in Example 2, consisting of a 1:1 mixture of polycaprolactone and thermoplastically processable starch, the latter having been destructured with 30% sorbitol, was subjected to a composting test and the determination of the biological degradability. In comparison with this, the biological degradability of cellulose was also measured.

Figure 6:
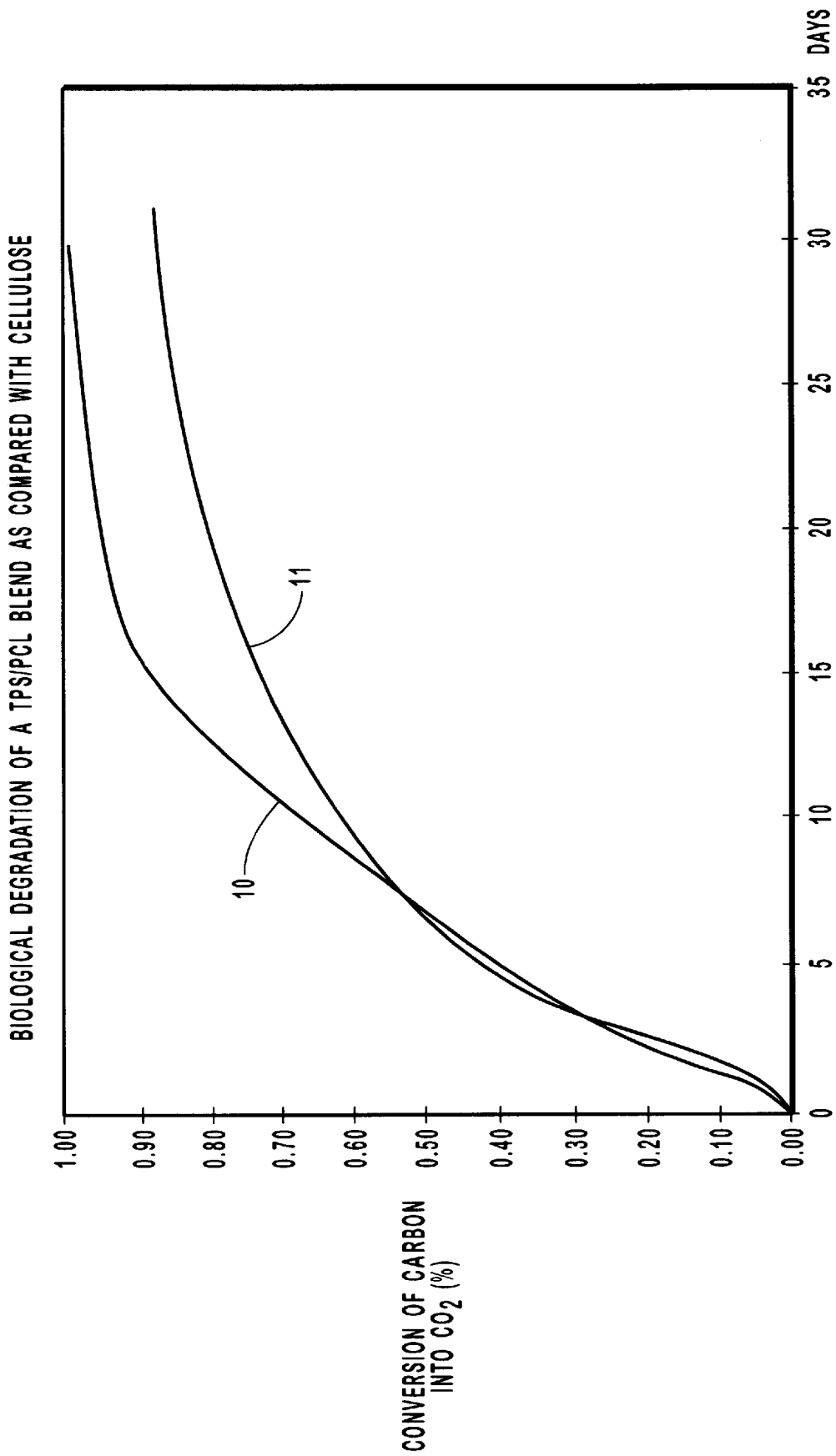
FIG. 6 shows the biological degradability of a polymer mixture in accordance with the invention as compared with cellulose.

The corresponding degradability results are shown in FIG. 6, the progressive degradation being measured as a function of the percentage conversion of carbon into $CO_2$. The diagram of FIG. 6 therefore shows, on the one hand, the composting of the caprolactone/TPS mixture, which is represented by the curve 10. In comparison with this, the degradability of cellulose is represented by the curve 11. While the PCL/TPS mixture is completely degraded within only thirty days, the degradation of cellulose is not yet completed in thirty days. The measurement of the degradability was effected by the Organic Waste System Inc. of Ghent, Belgium, and U.S. Standard AFTM D5338 was used as method of measurement.

Figure 7:
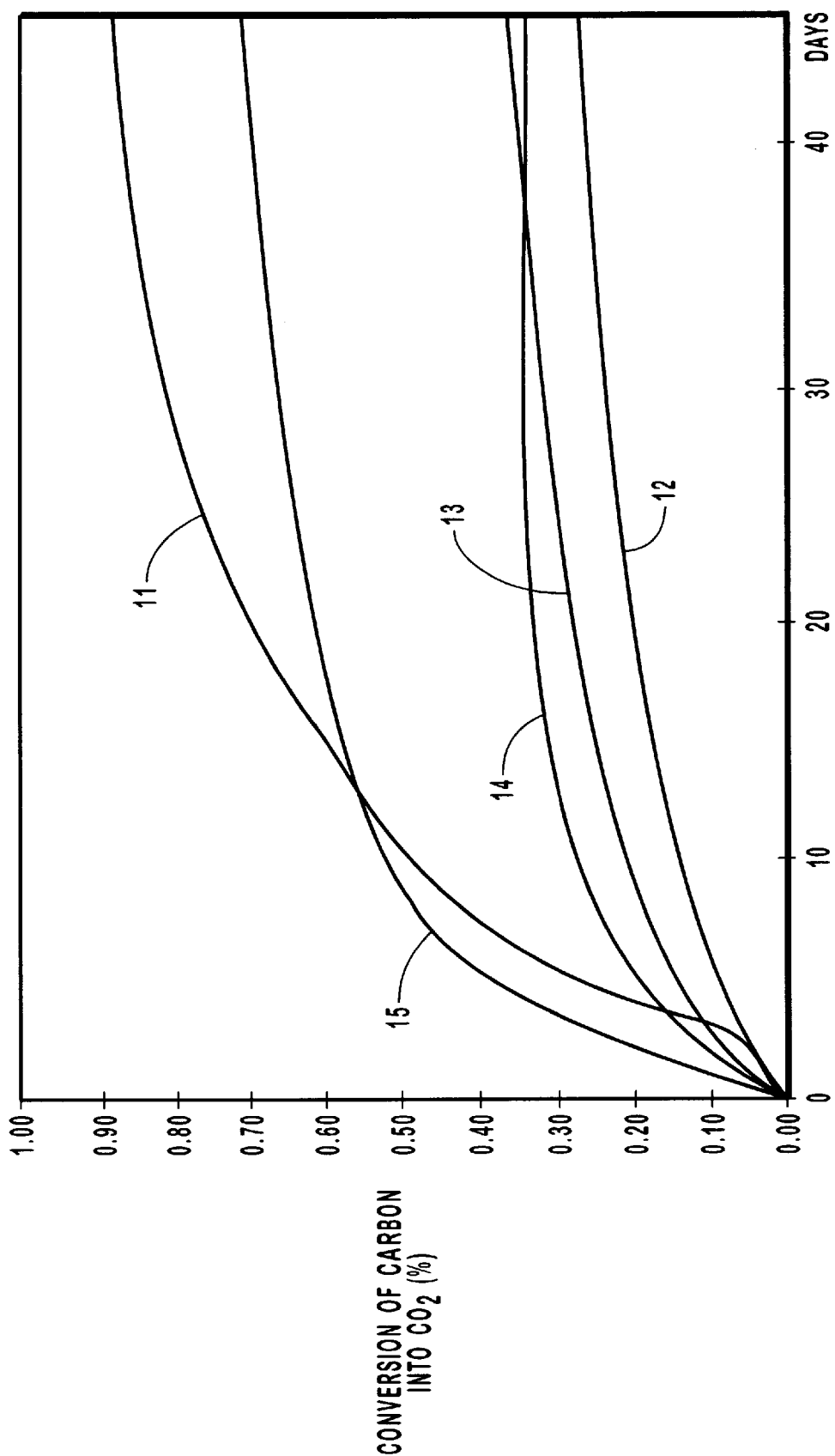
FIG. 7 shows the biological degradability of cellulose as compared with various so-called biologically degradable polymers.

In order further to document the excellent degradability of the polymer mixture prepared in accordance with the invention, the biological degradability of cellulose as compared with various, so-called biologically degradable polymers available on the market is shown in FIG. 7. In it, the curve 11 again shows the degradation of cellulose while the curve 12 rfers to a first sample, namely to a material of the Novomont Company known as "Chart BI". This material is a mixture of about 50% thermoplastically processable starch with an ethylene vinyl acetate copolymer having a hydrolysis content of about 75% and a content of polyethylene as copolymer. The thermoplastically proessable starch contains, inter alia, urea, sorbitol, and glycerol as plasticizing agent.

Curves 13 and 14 refer to Samples 2 and 3, comprising materials bearing the designation "Material BI" of the Novomont Company, these materials again containing 50% thermoplastically processable starch, about 40% polyvinyl acetate (hydrolyzed to the extent of about 85% to polyvinyl alcohol) and about 10% polyethylene as copolymers.

Finally, Curve 15 refers to a fourth sample of the Novon Company, which is a foamed material consisting of about 80% starch and about 20% polyvinyl acetate, the latter being hydrolyzed to the extent of about 850 to polyvinyl alcohol.

Samples 1 to 4 comprise, as a whole, materials which are available on the market as so-called biologically degradable polymers. As can be clearly noted from FIG. 7 however, the biologically degradability is in part substantially poorer than that of cellulose, the degradability of which itself is, in its turn, as shown in FIG. 6, poorer than the biological degradability of a polymer mixture prepared in accordance with the invention.

The curves of FIG. 7 where also obtained by the OWS Institute of Ghent, Belgium, in accordance with the AFTM Standard D5338.

The fact that the excellent biological degradability of the PCL/TPS polymer mixture prepared in accordance with the invention is not obtained at the expense of the mechanical properties is shown by the values in Table 3.1 below. In that table, the mechanical properties of a PCL/TPS mixture are set forth as compared with the properties of Samples 1 and 2 of FIG. 7. In this connection, the tensile stress upon rupture, the elongation upon rupture, and the energy density upon rupture of the three materials is shown, by of "dry" materials and materials which have been stored for 40 hours in water.

In this connection, Sample 6 is the TPS/PCL polymer mixture prepared in accordance with the invention, the biologically degradability of which is shown in Curve 10 in FIG. 6

TABLE 3.1

Change in the mechanical strength of blown-extruded sheets, "dry" and after storage in water

|  | Tensile Stress upon Rupture (mPa) | Elongation upon Rupture (%) | Energy Density as a Result of Rupture (MJ/m$^3$) |
| --- | --- | --- | --- |
| Sample 1 | 31 | 174 | 4.9 |
| Sample 1 after 40 hrs. storage in water | 27 | 255 | 6.2 |
| Sample 2 | 16 | 176 | 2.3 |
| Sample 2 after 40 hrs. storage in water | 48 | 6 | 0.2 |
| Sample 6 | 21 | 650 | 6.5 |
| Sample 6 after 40 hrs. storage in water | 19 | 850 | 8.0 |

From Table 3.1, it is clearly evident that Sample 2 is hydrolyzed relatively strongly upon storage in water and that the material has relatively poor resistance to water. In contrast to this, Samples 1 and 6, i.e., in particular the polymer mixtures prepared in accordance with the invention, show excellent resistance to water. The mechanical properties themselves are also substantially the same, those of Sample 6, however, being even better than those of Sample 1.

Furthermore, a specimen of Sample 4 was also included in the series of tests, but storage in water was not possible since the Novon material dissolved completely within only a few minutes. Measurement of the mechanical properties was, accordingly, not possible.

From the measurements in accordance with Example 3, it is evident that the biological degradability of the polymer mixture prepared in accordance with the invention is excellent and substantially better than the corresponding degradability of so-called biologically degradable polymers offered today on the market. Furthermore, it was possible to show that this excellent compostability was not obtained at the expense of the mechanical properties or of the resistance to water.

The examples described above cover, of course, only a small selection of possibilities for the preparation of a polymer blend in accordance with the invention. In principle, it is, of course, possible to mix any hydrophobic, thermoplastically processable and biologically substantially degradable polymer with thermoplastic starch, in which case, however, it is essential that in order to obtain sufficient mechanical properties of the polymer mixture produced in this manner, a phase mediator must be present in order to reduce the interfacial energy at the phase boundary. It is furthermore essential that the hydrophobic polymer in the mixture forms a matrix in which the starch is contained encapsulated.

Furthermore, it was found that it is essential for the invention that the production of the polymer blend take place substantially with the exclusion of water in order not to disturb or prevent the manner of functioning or the formation of the phase mediator.

A list of possible biologically degradable polymers available today on the market is in addition given below:
Zein (Zein F 4000) of Fenzian AG, CH-6002, Lucerne,
Ethyl cellulose (Ethyl Cellulose N 50) of Aqualon East BV, NL-2288 ER Rijswijk, Poly-E-Caprolactone of TONE Polymers (union Carbide Corporation),
Poly-L-Lactid of PURAC. biochem, NL-4200 AA, Gorinchem,
Cellulose diacetate (with unknown plasticizer) (BICCETA) of TUBIZE PLASTICS, B-1480 Tubize.

The above list sets forth only a few examples of biologically degradable polymers and is, of course, incomplete. All, for instance, synthetically produced hydrophobic polymers are, of course, suitable for the production of a polymer mixture in accordance with the invention, provided that they are biologically degradable: As example of this polyamide 6 may be mentioned.

Finally, it should also be added that a large number of the possible biologically degradable polymers are advantageously used with a plasticizer for the production of a polymer blend in accordance with the invention, since, on the one hand, these polymers are very brittle without plasticizer and, furthermore, the use of a plasticizer has proven advantageous, not least of all in order to reduce the melt viscosity. Thus it is, for instance, almost impossible to process zein without plasticizer since this material is very brittle. With the use of plasticizers, it is of course advantageous that they themselves also be biologically degradable. It should furthermore be noted that, if the plasticizer is hydrophilic, the amount of addition should not exceed a certain value since, otherwise, the resistance to water of the entire polymer mixture will be decisively impaired.

The following substances, among others, constitute suitable plasticizers for the different biologically degradable hydrophobic polymers:

| | |
|---|---|
| for zein | palmitic acid |
| | glycerol monostearate |
| | sorbitol |
| | triacetin |
| | Carvon |
| | 1,2-dodecanediol |
| | lauric acid |
| | ethyl levulinate |
| | dibutyl tartrate |
| | sebacic acid |
| | diethyl tartrate |
| | butyl lactate |
| | polyethylene glycol |
| | E-caprolactam |
| | levulic acid |
| | E-caprolactone |
| | glycerol |
| | triethylene glycol |
| for ethyl cellulose | epoxidized soy oil |
| | triacetin |
| | castor oil |
| | tributyl citrate |
| | acetyl tributyl citrate |
| | bis(2-ethylhexyl)phthalate |
| | bis(2-ethylhexyl)sebacate |
| | dibutyl adipate |
| | palmitic acid |
| | lauryl alcohol |
| | diethyl tartrate |
| | triglyceride |
| for cellulose acetate/ butyrate | acetyl-tri-ethyl citrate |
| | epoxidized soy oil |
| | triglyceride |
| | oleic acid derivatives |

The aliphatic polyesters are as a rule processed without plasticizer.

The above list of suitable plasticizers is intended to give a number of possible examples by which biologically degradable hydrophobic polymers can be plasticized. Of course, part of the plasticizers indicated for a polymer are suitable also for other biologically degradable hydrophobic polymers, in the same way, for instance, as a number of plasticizers suitable for ethyl cellulose are also suitable for the plasticizing of cellulose acetate-butyrate mixed ester.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A biologically degradable polymer dispersion consisting essentially of thermoplastically processable starch, at least one hydrophobic polymer that is biologically degradable and thermoplastically processable, and a phase mediator, wherein the thermoplastically processable starch is present in the dispersion as a disperse phase, the hydrophobic polymer is present in the dispersion as a continuous phase, and the phase mediator molecularly couples the phases together, wherein the hydrophobic polymer is selected from the group consisting of cellulose derivatives having a degree of substitution of up to 2, aliphatic polyesters, hydrophobic proteins, and mixtures thereof, wherein the dispersion includes less than about 1% water by weight of the dispersion, wherein the thermoplastically processable starch is obtained by mixing together native starch or a derivative thereof with at least one plasticizing agent included in a range from about 15% to about 40% by weight of the native starch or derivative thereof and adapted to at least partially swell or dissolve the starch or derivative thereof.

2. A biologically degradable polymer dispersion as defined in claim 1, wherein the plasticizing agent is included in a range from about 20% to about 35% by weight of the starch or derivative thereof.

3. A biologically degradable polymer dispersion as defined in claim 1, wherein the plasticizing agent is selected from the group consisting of sorbitol, glycerol, hydroxy acids, salts of hydroxy acids and polyvinyl alcohol.

4. A biologically degradable polymer dispersion as defined in claim 1, wherein the thermoplastically processable starch has a concentration in an amount of up to about 70% by weight based on the combined weight of the thermoplastically processable starch and hydrophobic polymer.

5. A biologically degradable polymer dispersion as defined in claim 1, wherein the thermoplastically processable starch has a concentration in a range from about 30% to about 70% by weight based on the combined weight of the thermoplastically processable starch and hydrophobic polymer.

6. A biologically degradable polymer dispersion as defined in claim 1, wherein the themoplastically processable starch has a concentration in a range from about 50% to about 65% by weight based on the combined weight of the thermoplastically processable starch and hydrophobic polymer.

7. A biologically degradable polymer dispersion as defined in claim 1, wherein the phase mediator has a concentration in a range from about 2% to about 100% by weight based on the weight of the hydrophobic polymer.

8. A biologically degradable polymer dispersion as defined in claim 1, wherein the phase mediator has a concentration in a range from about 5% to about 50% by weight based on the weight of the hydrophobic polymer.

9. A biologically degradable polymer dispersion as defined in claim 1, wherein the hydrophobic polymer is selected from the group consisting of cellulose ethers, cellulose esters, polycaprolactone, polyhydroxybutyric acid, hydroxybutyric acid/hydroxyvaleric acid copolymers, polylactic acid, zein, and mixtures thereof.

10. A biologically degradable polymer dispersion as defined in claim 1, wherein the phase mediator comprises a copolymer of caprolactone and vinyl alcohol.

11. A biologically degradable polymer dispersion as defined in claim 1, further including a plasticizer which is mixed with the hydrophobic polymer and which selectively reduces the melt viscosity of the hydrophobic polymer.

12. A method for manufacturing a biologically degradable polymer dispersion, the method comprising:
(a) combining (i) a starch component selected from the group consisting of native starch, starch derivatives, and mixtures thereof, (ii) a plasticizing agent capable of at least partially dissolving or swelling the starch component, and (iii) at least one biologically degradable hydrophobic polymer selected from the group consisting of cellulose derivatives having a degree of substitution of up to 2, aliphatic polyesters, and a hydrophobic protein;
(b) causing the starch component to form a thermoplastically processable melt by heating and mixing the starch in the presence of the plasticizing agent; and
(c) mixing the thermoplastically processable starch melt with the hydrophobic polymer in the presence of a phase mediator so as to form the biologically degradable polymer dispersion and in a manner so that the dispersion has a final water content of less than about 1% by weight of the dispersion, wherein the dispersion comprises a first thermoplastically processable starch phase dispersed throughout a second hydrophobic polymer phase and wherein the phase mediator acts to molecularly couple the first and second phases together.

13. A biologically degradable polymer dispersion as defined in claim 1, wherein the dispersion is in the form of a sheet.

14. A biologically degradable polymer dispersion as defined in claim 1, wherein the sheet comprises at least one layer on a multi-layer sheet.

15. A biologically degradable polymer dispersion as defined in claim 1, wherein the phase mediator comprises a block copolymer having at least two blocks, wherein at least one of the blocks is soluble in the hydrophobic polymer phase and at least one other of the blocks is soluble in the thermoplastically processable starch phase.

16. A biologically degradable polymer dispersion as defined in claim 15, wherein the dispersion is obtained by mixing together, at a water content of less than about 1% by weight based on the weight of the dispersion, the thermoplastically processable starch, the hydrophobic polymer, and the phase mediator wherein the phase mediator comprises a polymer which is at least partially soluble in the hydrophobic polymer phase and which comprises groups which have reacted with at least a portion of the thermoplastically processable starch so as to form the phase mediator.

17. A biologically degradable polymer dispersion as defined in claim 15, wherein the hydrophobic polymer at least comprises an aliphatic polyester and wherein the phase mediator comprises a transesteriffcation reaction product between at least a portion of the thermoplastically processable starch and at least a portion of the aliphatic polyester.

18. A biologically degradable polymer dispersion as defined in claim 17, wherein the phase mediator comprises a transesterification reaction product between at least a portion of the thermoplastically processable starch and a decomposition product of the aliphatic polyester.

19. A biologically degradable polymer dispersion as defined in claim 17, wherein the transesterification reaction product between the thermoplastically processable starch and the aliphatic polyester is formed by heating and mixing the starch and aliphatic polyester at a temperature of at least about 190° C.

20. A biologically degradable polymer dispersion as defined in claim 17, wherein the phase mediator comprises a copolymer of starch and caprolactone.

21. A biologically degradable polymer dispersion as defined in claim 1, wherein the native starch is initially predried to have a moisture content of less than about 10% by weight of the starch prior to mixing the starch with the plasticizing agent.

22. A biologically degradable polymer dispersion as defined in claim 1, wherein the native starch is initially predried to have a moisture content of less than about 6% by weight of the starch prior to mixing the starch with the plasticizing agent.

23. A method for manufacturing a biologically degradable polymer dispersion as defined in claim 12, wherein the phase mediator is combined with the starch and hydrophobic polymer in the form of a preformed block copolymer having at least two blocks, wherein at least one of the blocks is soluble in the hydrophobic polymer phase and at least one other of the blocks is soluble in the thermoplastically processable starch phase.

24. A method for manufacturing a biologically degradable polymer dispersion as defined in claim 12, wherein the phase mediator is formed by combining at least a portion of the starch with a phase mediator precursor that is at least partially soluble in the hydrophobic polymer phase and which includes groups which are reactive with the starch in order to yield a block copolymer comprising a reaction product of the starch and the phase mediator precursor.

25. A method for manufacturing a biologically degradable polymer dispersion as defined in claim 12, wherein the phase mediator precursor comprises at least a portion of the hydrophobic polymer.

26. A method for manufacturing a biologically degradable polymer dispersion as defined in claim 12, wherein the phase mediator is formed by heating and mixing the thermoplastically processable starch and hydrophobic polymer in a manner so as to yield a transesterification reaction product of at least a portion of the thermoplastically processable starch and at least a portion of the hydrophobic polymer.

27. A method for manufacturing a biologically degradable polymer dispersion as defined in claim 17, wherein the starch component initially comprises native starch.

28. A method for manufacturing a biologically degradable polymer dispersion as defined in claim 12, wherein the starch component initially comprises native starch which has been predried to have a water content of less than about 10% by weight of the starch.

29. A method for manufacturing a biologically degradable polymer dispersion as defined in claim 12, wherein the starch component initially comprises native starch which has been predried to have a water content of less than about 6% by weight of the starch.

30. A method for manufacturing a biologically degradable polymer dispersion as defined in claim 12, wherein the water content of the dispersion is reduced to about 1% or less by degassing the dispersion during mixing.

31. A biologically degradable polymer dispersion comprising:
a disperse phase including starch which has been made thermoplastically processable by heating and mixing native starch or a derivative thereof with a plasticizing agent;

a continuous phase including at least one hydrophobic aliphatic polyester that is biologically degradable and thermoplastically processable; and a phase mediator including a transesterification reaction product between at least a portion of the starch and at least a portion of the hydrophobic aliphatic polyester, wherein the transesterification reaction product is formed while mixing the starch and hydrophobic aliphatic polyester together in the presence of sufficient heat and sufficiently low water so as to promote the transesterification reaction.

32. A biologically degradable polymer dispersion as defined in claim 31, wherein the starch initially comprises native starch that has not been predried.

33. A biologically degradable polymer dispersion as defined in claim 31, wherein the starch initially comprises native starch that has been predried to have a water content of less than about 10% by weight of the starch.

34. A biologically degradable polymer dispersion as defined in claim 31, wherein the starch initially comprises native starch that has been predried to have a water content of less than about 6% by weight of the starch.

35. A biologically degradable polymer dispersion as defined in claim 31, wherein the hydrophobic aliphatic polyester comprises polycaprolactone, and wherein the phase mediator comprises a copolymer of starch and caprolactone.

36. A biologically degradable polymer dispersion as defined in claim 31, wherein the starch and aliphatic polyester are mixed at a temperature of at least about 190° C. in order to form the phase mediator.

37. A method for manufacturing a biologically degradable polymer dispersion comprising:

(a) providing an initial dispersion that includes (i) a first phase comprising starch that has been made thermoplastically processable by heating and mixing native starch or a derivative thereof with a plasticizing agent and (ii) a second phase comprising at least one hydrophobic aliphatic polyester that is biologically degradable and thermoplastically processable; and (b) mixing the initial dispersion at a temperature and sufficiently low water content so as to form a transesterification reaction product between at least a portion of the starch and at least a portion of the hydrophobic aliphatic polyester, wherein the transesterification reaction product comprises a phase mediator that molecularly couples the first and second phases together.

38. A method for manufacturing a biologically degradable polymer dispersion as defined in claim 37, wherein the starch initially comprises native starch that has not been predried.

39. A method for manufacturing a biologically degradable polymer dispersion as defined in claim 37, wherein the starch initially comprises native starch that has been predried to have a water content of less than about 10% by weight of the starch.

40. A method for manufacturing a biologically degradable polymer dispersion as defined in claim 37, wherein the starch initially comprises native starch that has been predried to have a water content of less than about 6% by weight of the starch.

41. A method for manufacturing a biologically degradable polymer dispersion as defined in claim 37, wherein the hydrophobic aliphatic polyester comprises polycaprolactone and wherein the phase mediator comprises a copolymer of starch and caprolactone.

42. A method for manufacturing a biologically degradable polymer dispersion as defined in claim 37, wherein the starch and aliphatic polyester are mixed at a temperature of at least about 190° C. in order to term the phase mediator.

* * * * *

UNITED STATES PATENT AND TRADEMARK OFFICE
CERTIFICATE OF CORRECTION

PATENT NO. : 6,214,043 B1
DATED : April 10, 2001
INVENTOR(S) : Kurt D. Krueger

It is certified that error appears in the above-identified patent and that said Letters Patent is hereby corrected as shown below:

<u>Title page,</u>
Item [75], Inventors, delete "Kimberly A. Anderson, Eagan;" and "Thomas F. Hinnenkamp, White Bear Lake".

<u>Column 8,</u>
Line 52, after "low" insert -- profile --.

Signed and Sealed this

Thirteenth Day of August, 2002

Attest:

Attesting Officer

JAMES E. ROGAN
*Director of the United States Patent and Trademark Office*